(12) United States Patent
Arps et al.

(10) Patent No.: US 6,272,256 B1
(45) Date of Patent: Aug. 7, 2001

(54) FAST COMPRESSION OF PERIODIC HALFTONED BITONAL IMAGES

(75) Inventors: Ronald Barthold Arps, Stanford; Mihail Corneliu Constantinescu, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/979,519

(22) Filed: Nov. 26, 1997

(51) Int. Cl.$^7$ ............................ H04N 1/415; G06K 9/36
(52) U.S. Cl. ........................................ 382/245; 358/261.3
(58) Field of Search ..................... 382/245, 246, 382/277; 358/261.1, 261.3, 432, 433; 341/67

(56) References Cited

U.S. PATENT DOCUMENTS

| | | | |
|---|---|---|---|
| 3,944,997 | * 3/1976 | Swallow | 340/324 AD |
| 4,888,645 | 12/1989 | Mitchell et al. | 358/261.1 |
| 4,901,363 | 2/1990 | Toyokawa | 382/56 |
| 4,965,677 | 10/1990 | Pennebaker et al. | 358/429 |
| 5,023,611 | 6/1991 | Chamzas et al. | 341/51 |
| 5,644,406 | * 7/1997 | Harrington | 358/433 |
| 5,684,895 | * 11/1997 | Harrington | 382/233 |
| 5,917,461 | * 6/1999 | Sakami | 345/29 |
| 5,991,448 | * 11/1999 | Go | 382/236 |
| 6,044,122 | * 3/2000 | Ellersick | 375/360 |

OTHER PUBLICATIONS

R. Hunter et al., "International Digital Facsimile Coding Standards", *Proceedings of the IEE*, 68:7, pp. 854–867, Jul., 1980.

*International Telecommunication Union—ITU—T Recommendation T–4*, "Standardization of Group 3 Facsimile Terminals for Document Transmission", pp. 5–22, Jul. 1996.

*International Telecommunication Union—ITU—T Recommendation T.6*, Facsimile Coding Schemes and Coding Control Functions for Group 4 Facsimile Apparatus, pp. 1–13, 1984, amended 1988.

*International Telecommunication Union—ITU—T Recommendation T.82*, Information Technology—Coded Representation of Picture and Audio Information—Progressive Bi–Level Image Compression pp. 23–26, Mar. 1993.

J. Ziv et al, "A Universal Algorithm for Sequential Data Compression", *IEEE Transactions on Information Theory* vol.IT–23 No. 3, pp. 337–343, May 1977.

J. Ziv et al., "Compression of Individual Sequences Via Variable–Rate Coding", *IEEE Transactions on Information Theory*, vol. IT–24, No. 5, pp. 530–536, Sep. 1978.

\* cited by examiner

*Primary Examiner*—Jerome Grant, II
(74) *Attorney, Agent, or Firm*—Baker, Maxham, Jester & Meador (57) ABSTRACT

A method and apparatus incorporating a binary function correlation of run edges for compressing periodic halftoned digital images while increasing compression ratios over currently known one- and two-dimensional and adaptive arithmetic methods and decreasing the time required to perform the operation. In one embodiment, the invention horizontally encodes an image's run edges located at or near least τ pixels ahead of a reference run edge in raster sequential image data. After the image is divided into lines of digital bits containing digital information indicative of binary values, the lines are encoded. A value for τ—where τ is independent of the width of the image and represents the periodicity for an edge of a run—is selected. Thereafter, run edges located τ±n pixels ahead of a designated run edge of a reference run are encoded.

52 Claims, 6 Drawing Sheets

FAST COMPRESSION OF PERIODIC HALFTONED BITONAL IMAGES

BACKGROUND OF THE INVENTION

1. Field of the Invention

The present invention relates to the compression of periodic halftoned digital images. More particularly, the invention concerns a way to increase the compression ratio obtained on periodic halftones using commonly known compression components, while reducing the time required to perform the compression.

2. Description of the Related Art

Data compression is a process of finding the most efficient way to represent a message in order to minimize the size of a message for transfer or storage. Data compression usually consists of two phases—choosing a model for the message source and designing an efficient coding system for the model.

A message generated by an information source may take on many possible forms depending upon the context in which the message was made, and the goal of compressed communication in general is to transmit the minimal encoded version of the original message such that the receiver of the message can still reconstruct it. For example, the information to be sent may be the results of a bicycle race. If the recipient of the message already knows the names and numbers of the cyclists, then all that must be transferred is the number of the cyclist that won. In another context, the number might mean something entirely different, such as the price of a dozen mangoes. Accordingly, the key to quick and effective compressed communication is minimizing the length of information that must be transferred to accurately send the correct message or in the case of a photograph, the correct image. Thus, the shortest representation of the source of the message—so that the message can be taken in context—and the message itself is critical to efficient compressed communications.

Generally, if each piece of information sent representing a message or image is not equally likely to occur it is more efficient on the average to allocate a short string to frequently occurring pieces of information and longer strings to less frequent pieces. Thus, Morse code allots the shortest string (a dot and pause) to the letter "e" because it appears most frequently in words, and allots a long string (dash, dash, dot, dot and pause) to the less frequently appearing letter "z."

One important area in data compression is the compression of periodic halftoned bilevel digital (halftoned) images used predominantly to prepare continuous tone photographic images for bitonal printing. Continuous tone (e.g., monochrome) photographs are transformed into a bitonal (e.g., black/white) "halftoned" equivalent, which in digital form is represented as a bilevel (e.g., "1" or "0" valued) image. Numerous methods used primarily for textual image compression have been attempted for compressing such bilevel halftoned images. For example, one-dimensional schemes, such as Modified Huffman (MH) coding, or two-dimensional schemes, such as the Modified Relative Element Address Designate (MR)—commonly referred to as the CCITT Group 3 compression scheme—are simple and efficient but unable to effectively compress halftoned images.

The MR coding method exploits vertical correlation between scan lines in textual images by attempting to code all black/white pixel color changes (BW edges) and white/black pixel color changes (WB edges) in an image with respect to a given reference edge located directly above in a previous line. If such coding fails or is not reproductable at a decoder. the method changes to an MH coding method, which uses alternating sequential run-length coders for alternating black and white runs. Note that this also equates to coding alternating BW and WB edge positions.

The MMR or Modified MR two-dimensional compressor coding method, widely known as the CCITT Group 4 compression scheme removes some error protection overhead from the MR coding method but is still unable to effectively compress halftoned images.

The problem with these one- and two-dimensional coding schemes for halftoned encoding is that binary halftoned representations of continuous tone images have very different distributions of run size and occurrences of vertical references from the text or line drawing images for which these schemes were designed. As a result, the amount of data required to represent halftoned images in "compressed" form when these schemes are used, may actually be greater than the amount of data required to represent the original uncompressed image.

Recently, complex adaptive coding methods like various Ziv-Lempel algorithms and the arithmetic coding based Joint Bi-level Image Experts Group (JBIG) algorithm as set forth in *ITU-T Recommendation T.82*, "Information Technology—Coded Representation of Picture and Audio Information—Progressive Bi-level Image Compression," have been developed which are aimed at compressing both textual and halftoned images. Unlike static algorithms like MH, MR or MMR used for textual images, these adaptive algorithms can adjust to the more balanced white and black pixel probabilities and shorter run length characteristics of halftoned images. The problem is that these adaptive algorithms are not simple nor fast enough to replace the above static algorithms in software. For example, the Ziv-Lempel algorithms build complex dictionaries or alternatively perform complex dictionary searches in real time. Typically, they also exploit byte-oriented characteristics rather than the bit-oriented characteristics of bitonal images. Although byte-processing makes the Ziv-Lempel algorithms faster in compressing bitonal images than adaptive arithmetic coding methods such as JBIG methods, these algorithms are not as fast as MH, MR or MMR. Furthermore, although JBIG will compress halftoned images much better than the Ziv-Lempel algorithms, it is even more complex and even slower in executing.

These above methods for compressing halftoned images constitute significant advances and enjoy widespread commercial success today. But what is needed is a simple and efficient method and apparatus for compressing halftoned images that increases compression ratios and decreases the time required to perform the compression over the commonly used MH, MR or MMR coding methods.

SUMMARY OF THE INVENTION

Broadly, the present invention concerns a method and apparatus incorporating a binary function correlation of pixel edges to compress periodic halftoned bitonal images. The invention efficiently compresses the images while increasing compression ratios over currently known methods and decreasing the time required to compress the data.

In one embodiment, the invention may be implemented to provide a method to compress and decompress the periodic halftoned digital (halftoned) images by horizontally encoding pixel edges located at least $\tau$ pixels from a reference pixel edge in raster sequential image data. After the image is divided into lines of digital bits containing digital information indicative of binary values, the lines are encoded. A value for τ—where τ is independent of a width (W) of the image and represents the pixel distance or period between pixel value changes (edges)—is selected. Thereafter, most edges occurring among successive target pixels to be coded, are encoded with respect to designated reference pixel edges located τ±n pixels earlier. This process. discussed in detail below, repeats until the entire image has been encoded.

In other versions, the method may include encoding groups of successive same valued target pixels where the pixel edge of each group is located τ±n pixels from the edge of a designated reference pixel group. Or the method may include encoding groups of successive pixel edges where all pixel edges in the group occur exactly τ±n pixels from their designated reference pixel edges.

In another embodiment, the invention may be implemented to provide an apparatus to compress and decompress a halftoned image. The apparatus may include an encoder, a decoder, multiple interfaces and a digital data processing apparatus for executing the method. Or the invention may be implemented by application specific hardware designed to perform the encoding and decoding functions.

In still another embodiment, the invention may be implemented to provide an article of manufacture comprising a data storage or transmission device tangibly embodying a program of machine-readable instructions executable by a digital data processing apparatus to perform method steps for compressing halftoned images.

The invention affords its users with a number of distinct advantages. One advantage is that the invention provides superior compression of periodic halftoned bitonal images by exploiting known periodicities in a halftoned image. A further advantage is that the periodicity is not limited in size to the width of a line as is the case in prior art compression methods. Another advantage is that the invention overcomes the MMR algorithm's inability to efficiently compress halftoned images without using real-time adaptive compression methods like Ziv-Lempel or arithmetic coding. Another advantage is that the software speed required to perform the decompression of the halftoned image data is reduced from that required by MMR.

The invention also provides a number of other advantages and benefits, which should be apparent to one skilled in the art from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Figure 1:
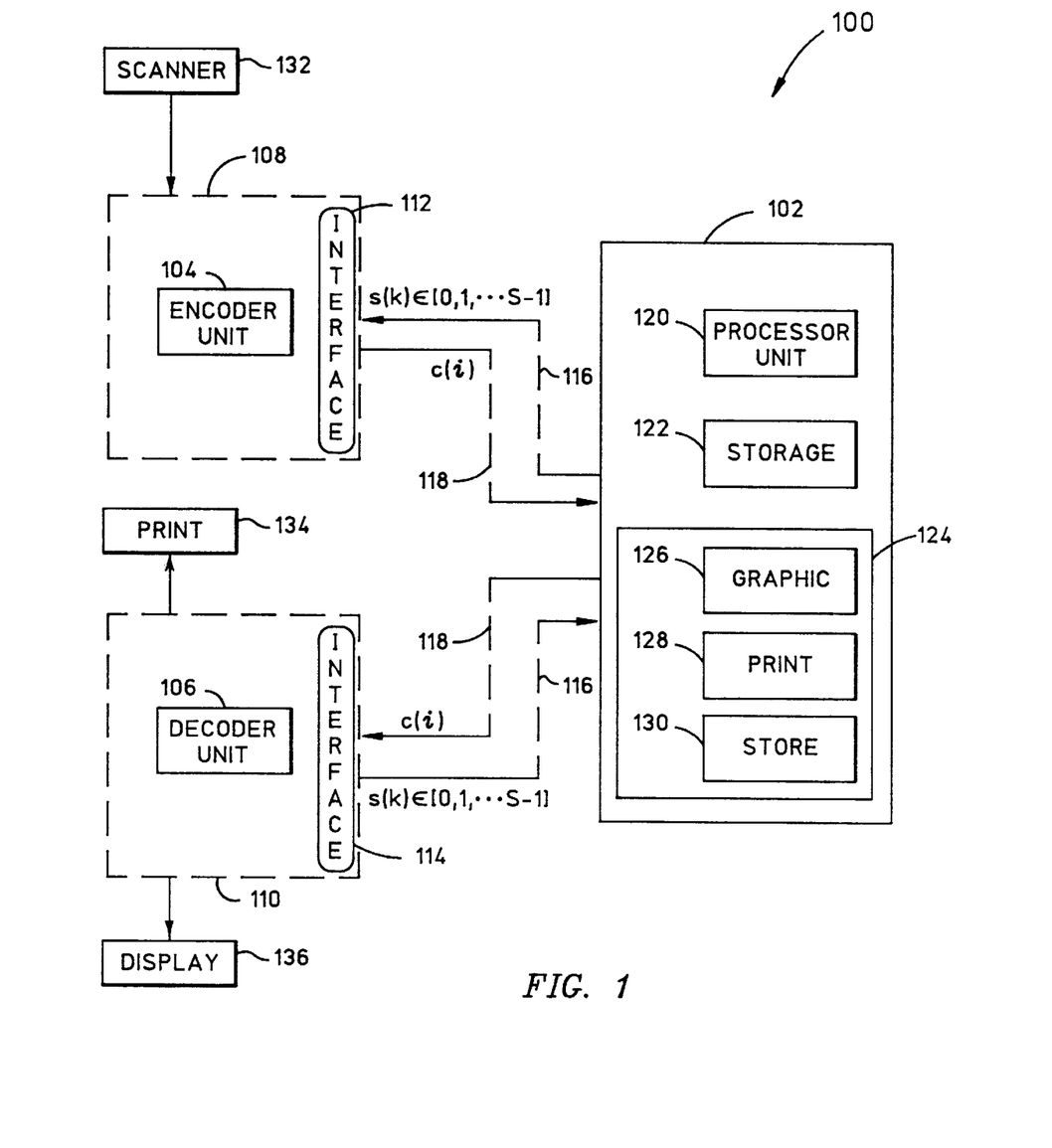
FIG. 1 is a block diagram of the hardware components and interconnections of a digital data processing machine in accordance with the invention.

One aspect of the invention concerns an apparatus which may be embodied by various hardware components and interconnections. FIG. 1 shows an example of one such digital data processing apparatus 100. The apparatus 100 may include a computer 102 housing a processor 120, such as a microprocessor or other processing machine, coupled to storage 122. In the present example, the storage 122 may include a fast-access memory and nonvolatile storage (not shown). The fast-access memory preferably comprises random access memory, and may be used to store the programming instructions executed by the processor 120 during such execution. The nonvolatile storage may comprise, for example, one or more magnetic data storage disks such as a "hard drive", a tape drive, or any other suitable storage device. The apparatus 100 also includes input channels 116 and output channels 118, such as a lines bus, cable, electromagnetic link or other means for exchanging data with an encoder 104 and a decoder 106.

In one embodiment, the computer 102 may be, for example, a personal computer or mainframe computer manufactured by the International Business Machines Corporation of Armonk, N.Y., and may use an operating system sold under trademarks such as MVS, OS/2, or Windows NT. Alternatively, the computer 102 may be an IBM RS/6000 530 workstation with 128 MB of main memory running AIX 3.2.5. The computer 102 may incorporate a database system, such as DB2 or ORACLE, or it may access data on files stored on a data storage medium such as disk, e.g., a 2 GB SCSI 3.5" drive or tape. Additionally, FIG. 1 shows that the computer 102 preferably includes an output module 124 for outputting/displaying information and images on a graphic display 126, print mechanism 128 or data storage medium 130. Other computers, computer architectures or database systems than those discussed above may be employed. For example, the encoder 104 may be incorporated in a facsimile machine or in the computer 102, or the invention may be embodied in special purpose hardware like an integrated circuit.

The encoder may be housed in a first unit 108 and communicate with the computer 102 through a first interface 112. The interface may act as an input mechanism for establishing transmission parameters and certain variables, which may be implemented in suitable computer code. The interface 112 includes appropriate apparatus for formatting the data stream into whatever signal format is employed in the input/output channels 116 and 118. Such interface apparatus are well known in the art.

Similarly. the decoder 106 communicates with the computer 102 through a second interface 114. The interface communicates with and receives information from the computer 102 via input line 116 and output line 118. The decoder and the encoder 104, although shown as housed within a first unit 108 and a second unit 110, respectively, may both be included in the first unit 108, the computer 102, a facsimile machine, a print machine 134, a display 136, a scanner 132 or in any compatible device for which the encoder and/or decoder is performing a desired function. The interface 114 used in connection with the decoder 106 may be the same interface as interface 112, or if separate, of the same character and quality. In an alternate embodiment, the scanner 132, the print machine 134 or the display 136 may be externally communicatively coupled to the decoder unit 106 or the interface 114.

In the simplified block diagram of FIG. 1, the encoder 104 receives data symbols s(k)—the symbols equating to a binary representation of a periodic bitonal halftoned image—and encodes them into a compressed data stream c(i) and passes them to the interface 112 for transmission to the decoder 106 via output/input channels 116 and 118. The decoder 106 may receive the data stream and decode it to obtain reconstructed replicas of the original symbols s(k). The symbols may be chosen from the integers [0, 1, . . . , S−1], or a binary representation thereof. The assumption is that the symbol values are positive integers for clarity purposes. However, those skilled in the art will realize that the symbols may take on other than integer values. The symbols s(k) are supplied to the encoder 104 and employed therein to generate encoded data stream c(i).

Despite the specific foregoing description, ordinarily skilled artisans having the benefit of this disclosure will recognize that the encoder 104 and the decoder 106 discussed above may be implemented in a machine of different construction, without departing from the scope of the invention. As one example of many, one of the components such as print mechanism 128 and graphic 126 may be eliminated fromcomputer 102; furthermore, the storage 122 may be provided on-board the processor 120, even though depicted separately in FIG. 1. Also, the processor 120 may be included in the first unit 108, the second unit 110 or in a machine using the encoding/decoding method of the present invention.

OPERATION

In addition to the various hardware embodiments described above, a different aspect of the invention concerns a method for compressing and decompressing periodic halftoned bitonal images. The method is expressed in terms of existing MMR (CCITT Group 4) methods and can be understood by those familiar with the MMR algorithm as discussed or referenced in *ITU-Recommendation T.6*, "Facsimile Coding Schemes and Coding Control Functions for Group 4 Facsimile Apparatus," International Telecommunication Union, 1998, 1993, or U.S. Pat. No. 4,888,645 entitled "Method for Encoding and Decoding a Digital Image," issued Dec. 19, 1989 to the assignee of the current invention.

Signal-Bearing Media

Such a method may be implemented, for example, by operating the encoder 104 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to compress and decompress periodic halftoned bitonal images.

Figure 2:
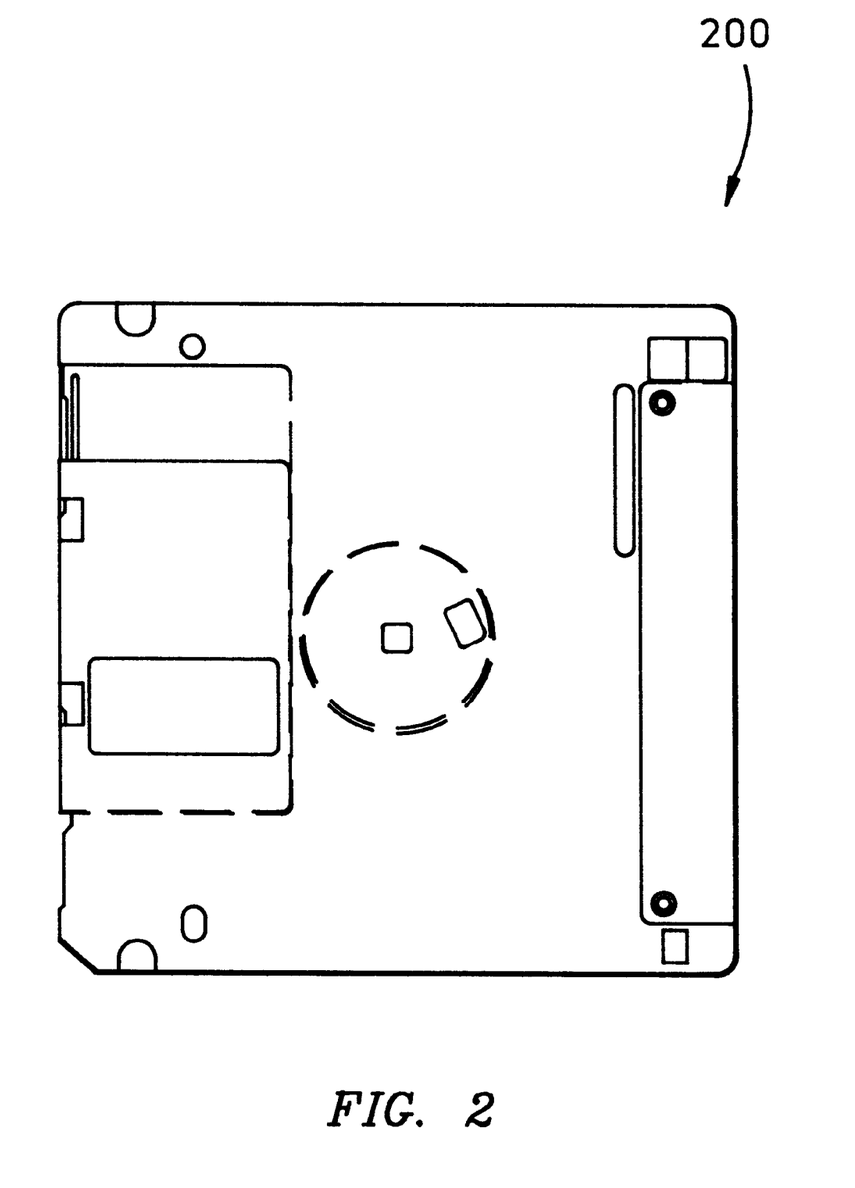
FIG. 2 is a perspective view of an exemplary signal-bearing medium in accordance with the invention.

This signal-bearing media may comprise, for example, RAM (not shown) contained within the first unit 108 or the encoder unit 104. Alternatively, the instructions may be contained in another signal-bearing, media, such as a magnetic data storage diskette 200 shown in FIG. 2, directly or indirectly accessible by the encoder 104. the computer 102 or the decoder 106. Whether contained in the encoder or elsewhere, the instructions may be stored on a variety of machine-readable data storage media. such as DASD storage (e.g., a conventional "hard drive" or a RAID array). magnetic tape, electronic read-only memory (e.g., ROM, CD-ROM, EPROM or EEPROM), an optical storage device (e.g., CD-ROM, WORM, DVD, digital optical tape), paper "punch" cards or other suitable signal-bearing media including transmission media such as digital and analog and communication links and wireless. In an illustrative embodiment of the invention, the machine-readable instructions may comprise lines of compiled C, C++, or other suitable language code.

The Encoding/Decoding Scheme

Figure 3:
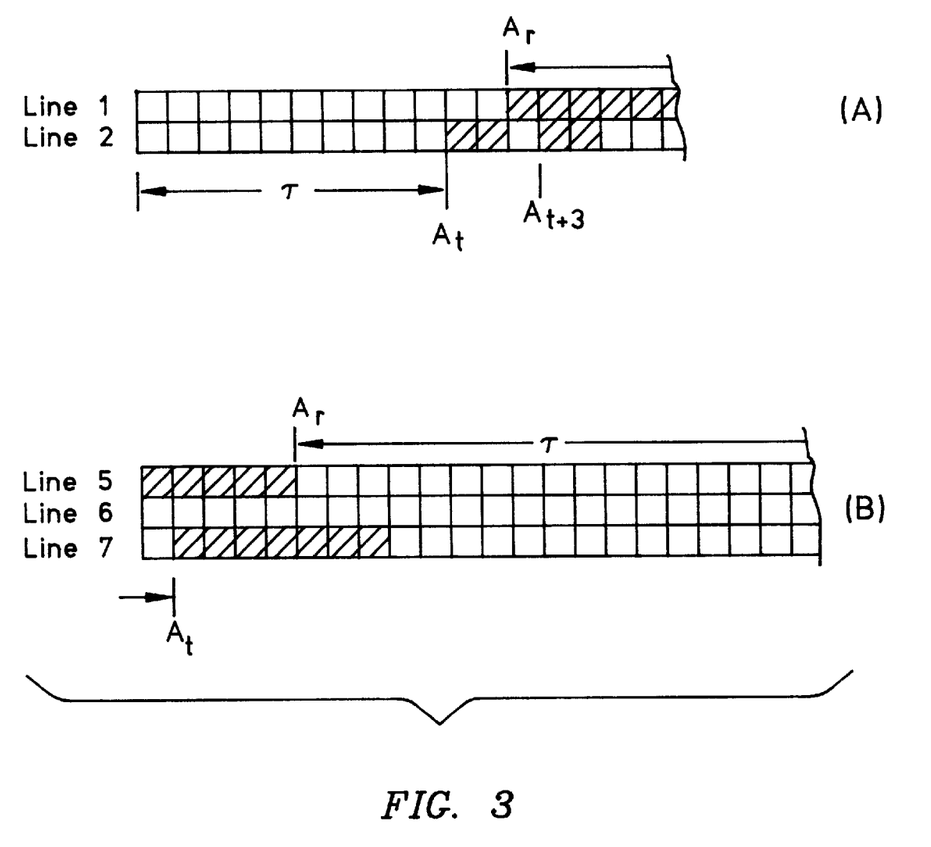
FIGS. 3A and 3B show a section of a typical image and illustrate the encoding of a run edge.

FIGS. 3A and 3B illustrate the advantage to be gained by horizontally encoding halftoned data when the periodicity is not constrained to equal the width (W) of a line of image as in the case of MMR. It should be appreciated that in FIGS. 3A and 3B all of the lines of the halftoned image are not shown, and only segments relative to the discussion appear. In one embodiment, the reference edge used for encoding a target edge is found in raster sequence before the target edge being encoded, and the distance between the reference edge and the target edge is limited by the size of the image and by it being a non-contiguous vertical edge. However, regardless of the embodiment, a reference edge or a target edge must be a vertical edge, that is, an edge that represents a horizontally adjacent pixel intensity change.

Figure 4A:
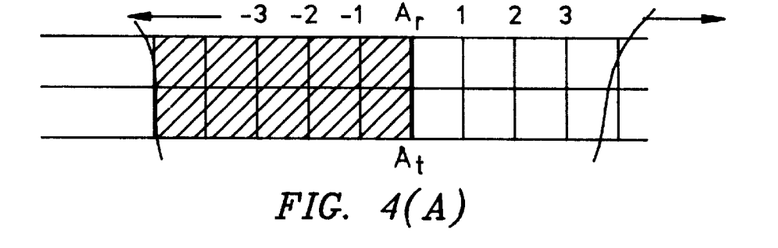
FIGS. 4A–4C illustrate a contiguous and a non-contiguous edge as used in accordance with the present invention.

A contiguous edge is shown in FIG. 4A. $A_r$ is a reference edge and $A_t$ is a target edge. To be contiguous to a designated edge, an edge must be: 1) of the same type color change (i.e., BW and BW, or WB and WB); 2) causally adjacent, that is, in the image line above the designated edge; and 3) the nearest possible candidate in the above image line. For example edge $A_r$ in FIG. 3A is contiguous to edge A, and in FIG. 4A, $A_t$ is contiguous to $A_r$.

Figure 4B:
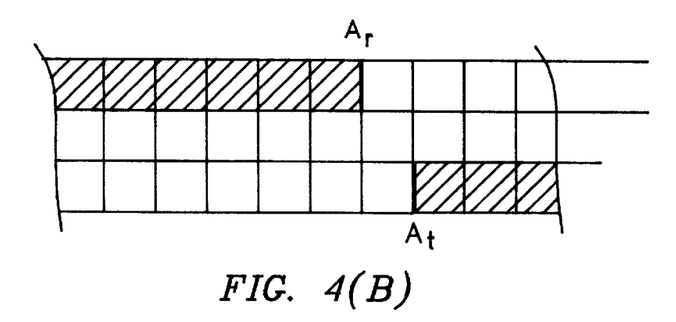
Figure 4C:
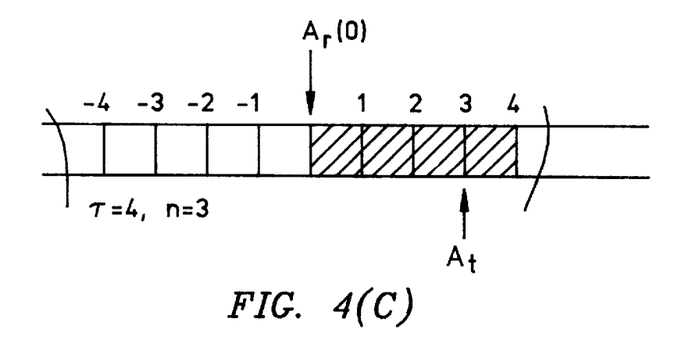

However, in neither FIG. 4B or 4C is edge $A_t$ contiguous to edge $A_r$. In both FIGS. 4B and 4C, $A_r$ is not causally adjacent to $A_t$. Unlike prior art methods, the present invention does not exploit contiguousness between a reference edge and a target edge. The present invention exploits non-contiguousness between the respective vertical edges. However, where necessary, such contiguous edge relationships will be used by the present invention.

In the FIG. 3A embodiment of the invention, a designated reference BW edge located on line 1 is marked as $A_r$. As indicated, an edge marks horizontally adjacent pixel color chances. One example would be the "boundary" between runs of different colors, such as the edge between a run of one or more dark pixels and a run of one or more light pixels. A target edge is located on line 2 a distance τ pixels from $A_r$, where τ is a periodicity that is preselected depending upon the application. The target edge is marked as $A_t$. In one embodiment of the invention, only target edges that are τ pixels from a respective reference edge within the same raster scan line are encoded. A target edge located a distance τ pixels from a reference edge has a reference difference of zero. represented as "r(0)", is encoded as such.

FIG. 3A also shows a second target edge located on line 2 and three pixels beyond $A_r$. In another embodiment of the invention, such a target edge may be encoded even if a periodicity τ is selected as in the first example. In this case, a target pixel $A_{t+3}$ is located τ±n pixels from the reference edge $A_r$, where n=+3, expressed as a reference difference of r(+3). If the second target edge were located three pixels to the left of $A_r$, then n=−3 and is expressed as a reference difference of r(−3). Limits on a reference difference may be specified, such as restricting encoding for a periodicity of τ to no greater than an n=3 absolute reference difference. Thereafter, for edges with r(4) or greater, an alternative coding method like MH must be used.

The distance τ may be any value and is not related to the width of a line or the width of a page nor does the encoding method require any reformatting of lines to logically narrow or widen the width of a page, such as a technique used in U.S. Pat. No. 4,965,677 and entitled "Compression of Binary Halftoned Images," issued Oct. 23 1990. As shown in FIG. 3B, the reference edge $A_r$ may be located in a line 5 of a halftoned image. A line 6 of the image contains no color changes, and a target edge $A_t$ is shown in line 7. Assuming the number of pixels between $A_r$ and $A_t$ is equal to τ, the target edge may be encoded relative to $A_t$ even though τ is much greater than the width of a line of the page on which the image produced. Similarly. even if $A_t$ has a reference difference from τ of r(n), where n=+4, the target edge may still be encoded relative to $A_r$, assuming n is not restricted to absolute values less than 4.

The present invention is not limited to one dimensional encoding of rasterized scan lines. In another embodiment, τ may take on a first coordinate value of $\tau_x \pm n$ and a second coordinate value of $\tau_y$. By allowing a vertical run edge to be defined by $\tau_x \pm n$ and $\tau_y$, the edge defines a color change within a region of the causal area or at the boundary between regions. When rasterized, the vertical edge equates to a run edge in raster sequential image.

Figure 5:
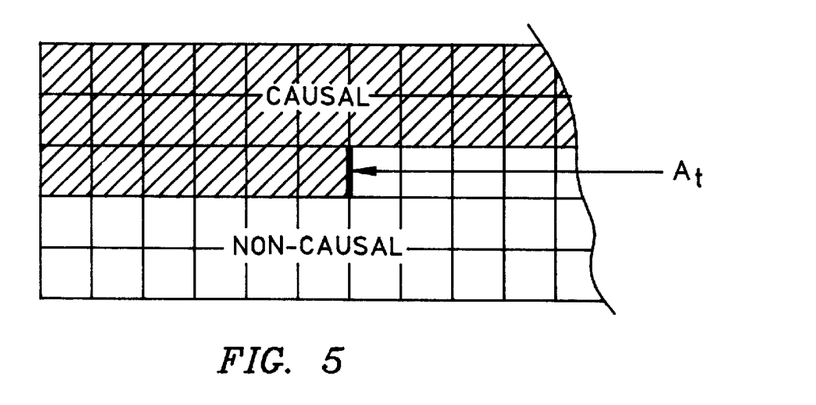
FIG. 5 pictures causal and non-causal data as used in accordance with the invention.

FIG. 5 illustrates what is meant by causal data. Causal data is the data which has been previously encoded. As marked, causal data in FIG. 5 is all encoded data occurring to the left and above the edge $A_r$. Non-causal data—data yet to be processed—appears to the right and below of edge $A_r$.

Overall Sequence of Operation

Figure 6:
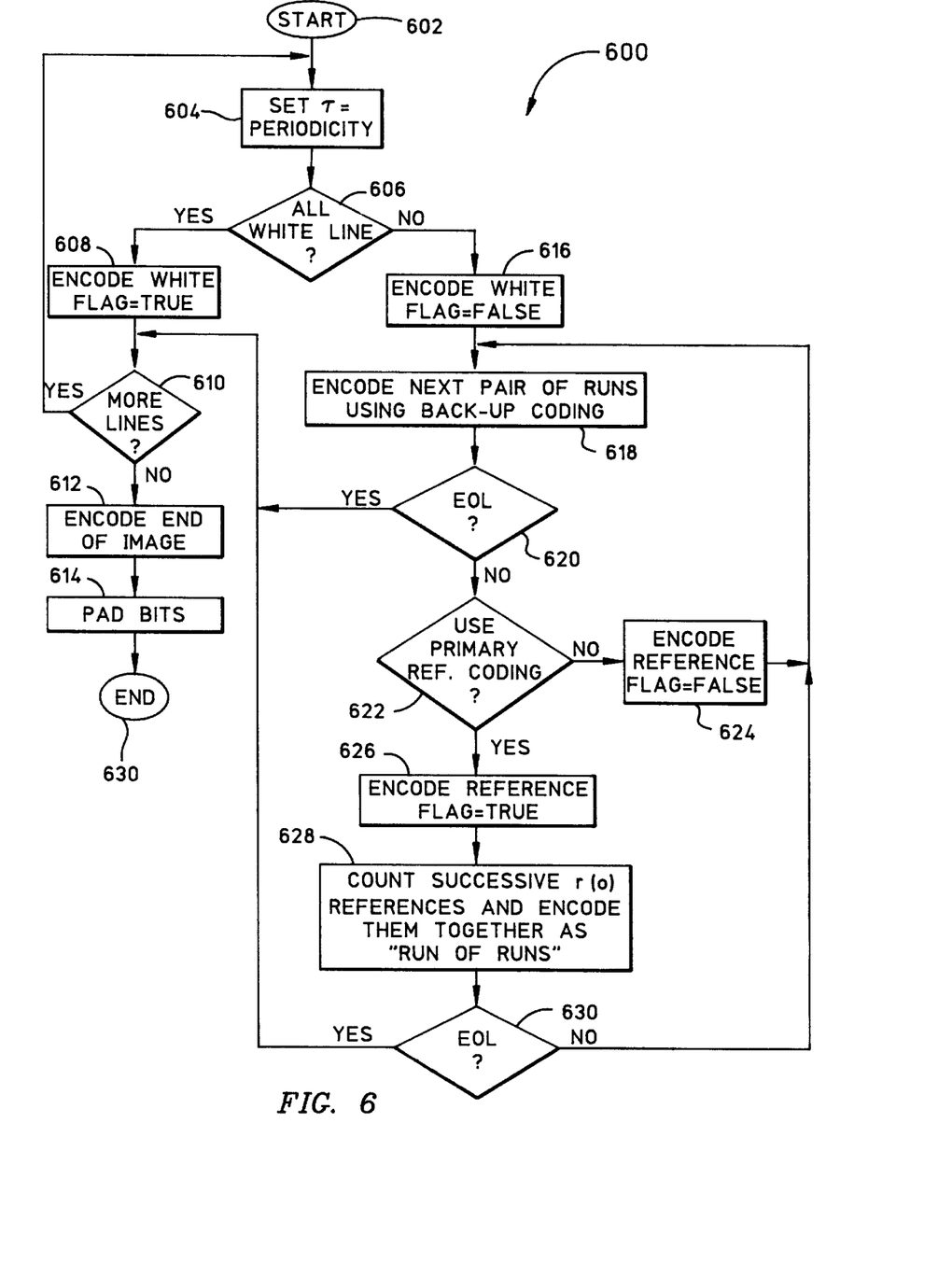
FIG. 6 shows a flowchart of an operational sequence for encoding spacially periodic images in accordance with one embodiment of the present invention.

FIGS. 6A and 6B show a sequence of method steps 600 to illustrate one example of the method aspect of the present invention. For case of explanation, but without any limitation intended thereby, the example of FIGS. 6A and 6B are described in the context of the apparatus 100 described above. The steps are initiated in task 602, and a value for τ is specified in task 604. The variable τ represents the periodicity, that is, an occurrence at regular intervals of a BW or WB edges of 'runs' of one or more same colored pixels. Any edge in the encoding sequence that is exactly τ pixels from its reference edge is said to have a reference difference of zero represented as r(0).

The periodicity τ may be specified depending upon, for example, the characteristics of the halftone generating method being used to reproduce the original image, which in turn may be tailored to the print head used in reproducing the image. It may also be desirable to specify periodicity when scanning a halftoned image which has an underlying periodicity sought to be exploited.

After τ has been selected line coding begins. If the line of the image to be coded is all white in task 606, then a TRUE flag, bit is placed at the beginning of the encoded line in task 608. If a TRUE flag bit is indicated, encoding the first line, the method searches for more all white lines to be encoded in task 610. If more lines exist in the image, the method 600 returns to task 606. If necessary, τ can be reset in task 604 to change the periodicity for encoding line. If no more lines remain to be encoded an end of image bit is encoded in task 612 by the use of a code word commonly used in MH encoding reserved for this purpose. Preferably, the first bit of this code word is false implying the beginning of a non-All White line. In such a case, backup coding is invoked and begins by encoding a White run. Counting the leading non-All-White line flag bit the total end-of-image code word is included in the code space for MH White run encoding. If the end of the image has been reached prior to the last bit of a byte, pad bits may be added in task 648 in order to synchronize the encoding of the image with the end of the last byte in which it appears. The method 600 ends in task 630.

If the line is not all white, then a FALSE flag bit is placed at the beginning of the encoded line in task 616 and the present method encodes the first pair of runs in the line using backup coding in task 618. A pair of runs is defined as two sets of adjacent identical pixels located side-by-side in which one pixel set varies in color from the other pixel set. A set may comprise one or more pixels. If the first pixel of the line is black, the backup coding, which assumes that the first pixel and run is white, encodes the first target edge as that of a white run having a length of zero. After encoding the first pair of target edges, the method proceeds to task 620. If the end of the line being encoded has been reached, a determination of whether more lines need to be encoded is made in task 610 as discussed above.

If the end of the line has not been reached, a decision is made in task 622 as to whether the primary encoding method of the present invention should be employed for the next target edge. For example, the primary reference encoding method, where a run has a reference difference of r(o), might not be used in situations where erratic periodicities suggest using backup coding for encoding the next target edge. Other circumstances may also preclude the use of the present invention's primary encoding method. If primary encoding cannot be used, a reference Hag set to FALSE is encoded in task 624 and backup coding is used to encode for the next pair of runs in task 618.

The backup coding referenced through the various embodiments of the present invention is similar to the MH algorithm, but constrained to encode a pair of successive BW or WB runs. The MH algorithm encodes black or white runs using separate Huffman codes (black run coder and white run coder tables). A discussion of Huffman codes may be found in "Compression of Text and Binary Files Using Adaptive Huffman Coding Techniques," IEE Southeast Conference, Apr 11–13. 1988, Knoxville. Tenn., pp. 660–663.

If the reference coding of the present invention can be used in task 622, a reference flag set to TRUE is encoded. The flag signals that the primary reference coding is being used.

The present invention identifies the edge of a run and $A_t \neq A_r$. A marker $A_r$, similar to the marker shown in FIGS. 3A and 3B, may be employed in detecting target edges located τ pixels from $A_r$. For example, once discovered, the target edge designated in FIGS. 3A and 3B as $A_t$ is encode.

In the preferred embodiment, the primary reference encoding comprises counting successive r(o) references and encodes them as "runs-of-runs" in task 628, that is, combining successive groups of target edges and encoding them together. In this embodiment, where r(0) is the only reference difference used, the method encodes all successive r(0)s together using a run-length encoder. Preferably, a white runs Huffman code table is used after changing τ to make a run of r(0)s map into pseudo-white runs that are one pixel shorter. After the runs-of-runs have been encoded, if the end of the line has been reached in task 430, the method returns to task 610 to find more lines to encode. If the end has not been reached, the method returns to task 618 and encodes the next pair of runs using the back-up coding.

In an alternative embodiment, pass coding may be used. Pass coding may be necessary because reference coding requires not only finding reference edges at the correct periodic distance τ for encoding a target pixel, but that synchronization of these reference edges is maintained between the encoder 104 and the decoder 106. Pass coding is used to occasionally skip past reference edges to reach reference edges appropriately synchronized with the target edge to be encoded. For example, in the preferred embodiment a target edge is specified at a reference distance equal to zero from a reference edge, that is, r(0). However, it may be most efficient to pass a reference edge and use a subsequent reference edge for encoding the target edge. This "passing" of a reference edge is pass coding.

Pass coding may be used to logically move a reference edge forward or backwards with respect to a target edge. In another embodiment, pass coding may be used in combination with the coding of group references. Group references are discussed below.

If pass coding is employed, then after the reference flag has been encoded in task 626, the next reference edge is skipped. Pass coding may be employed on repeated occasions. Assuming pass coding is not needed, the preferred embodiment primary reference encoding is performed with respect to target pixels that occur at a reference distance of r(0), or a modified encoding may be used.

In one embodiment of the method 400, the periodicity τ may changed and re-specified at prearranged intervals, such as at every page, stripe, two-dimensional tile, scan line, fixed length block or at some point in time to reflect an adaptively determined interval. This change to τ is transmitted using a prearranged protocol which may be embodied in interface 112 or communicated between the encoder 104 and the decoder 106 in the data stream as shown in FIG. 1. Transmitting a changed periodicity guarantees that the encoder and decoder utilize the same intervals and remain synchronized. Protocols or methods for communicating changes to τ may include using a header to specify a new τ value, or transmitting vectors of τ values in the compressed data as individual τ-valued prefix or suffix extensions to each data block, that is to each line.

In contrast to the MMR method, the present invention decouples its parameter τ—used by MMR to specify the distance into the past raster data for reference coding—from simply being equal to the width of a scan line. By decoupling τ from the width, the correlation between vertical edges at a periodicity in a halftoned image may be exploited instead of being limited to the correlation only between vertically adjacent pixels in the image. The MMR method of correlating an encoding scheme to vertically adjacent pixels might be preferable encoding for textual images, but it is not as efficient as the present invention in compressing period bitonal digital images. The benefits of the invention become obvious as shown by the performance improvements discussed below.

In this embodiment, runs having a reference difference other than r(o) are encoded. Small periodicity variations can be handled, that is, where a target edge is slightly offset from the paramaterized distance τ. For example, the target edge may be at a reference distance of r(0), equal to τ±n pixels, where n=+3. By allowing the reference difference to vary, this embodiment adjusts for gradually changing gray values in generated halftoned or "fuzzy" quantized edges in, for example, scanned periodic halftones. Unlike the adaptive arithmetic encoding methods, which exploit periodic pixel values, this embodiment of the present invention exploits periodic vertical edges and, by allowing τ to vary at preset intervals, allows the method to track gradually changing periodicities. It the r(±n), where n≠o, the run is encoded as discussed above. Assuming this modified encoding method is used, after the run has been encoded, the method continues in task 630 where an end-of-line determination is made.

Figure 7:
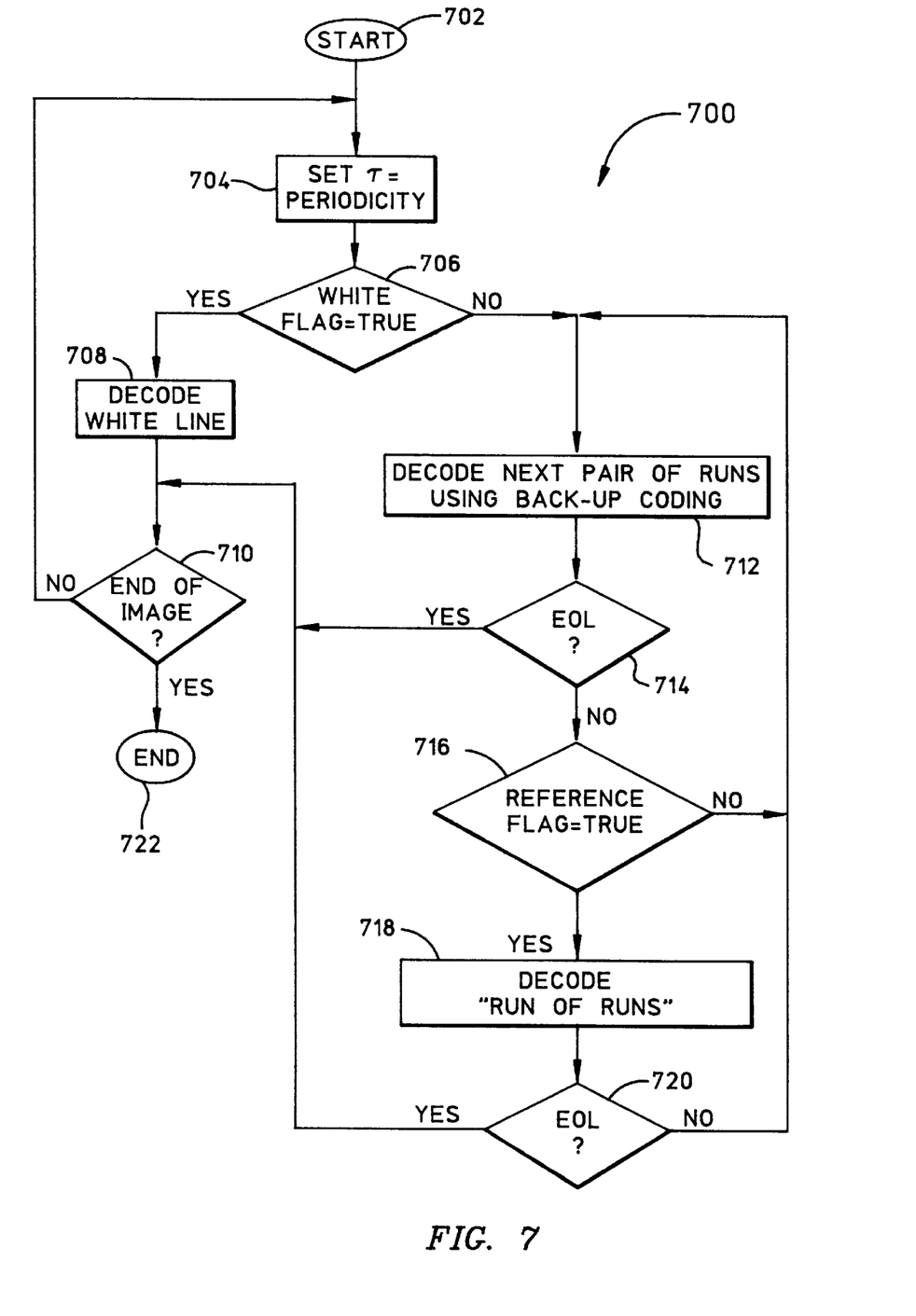
FIG. 7 shows a flowchart of an operational sequence for decoding spacially periodic images in accordance with one embodiment of the present invention.

The preferred embodiment of the present invention also includes a method to decode a previously encoded image. A sequence of method steps 700 is shown in FIG. 7, and illustrates one example of the decoding method of the present invention. The method starts in task 702 when an image to be recorded is received. The variable τ is set equal to the known periodicity in task 704 as was the case in the encoding method described above. After the periodicity has been set, if a white flag equal to TRUE is encountered in task 706, indicating a white line, then the method decodes a white line in task 708. After decoding the white line, if the end of the image to be decoded has been reached in task 710, the method ends in task 722. However, if the end of the image has not been reached, then the method returns to task 704 and the variable τ representing the current periodicity may be reset as defined by the image being decoded.

If in task 706 a white flag set equal to FRUE is not encountered, then the next pair of runs is decoded using the back-up decoding method in task 712. The back-up decoding method uses the Huffman decoding table referenced and discussed in "Compression of Text and Binary Files Using Adaptive Huffman Coding Techniques," IEE Southeast Conference, Apr. 11–13, 1988, Knoxville, Tenn., pp. 660–663.

After the next pair of runs has been decoded, if the end of the line being decoded has been reached is task 714, then the method returns to task 710 to determine whether the end of the line is also the end of the image. But, if the end of the line being decoded has not been reached, a run-of-runs is decoded in task 718 if a reference flat equal to TRUE has been discovered in task 716. If a reference flag equal to TRUE is not discovered in task 716, then the pair of runs is decoded using the back-up decoding method of task 712 and the decoding method continues. Assuming a run-of-runs has been decoded in task 718, if the end of the line being decoded has been reached then the method returns to task 710 and decides whether or not the end of the image has also been reached. However, if the end of the line has not been reached in task 720, the method returns to task 712 and decodes the next pair of runs using the back-up decoding method.

In another embodiment of the decoding method of the present invention, an encoded pass or an encoded run where the edge was not equal to r(0) may be decoded in task 718. If the reference flag in task 716 has been set to TRUE, then this embodiment of the present invention, depending upon the encoded run encountered in the image, may invoke the decoding of a pass, run-of-runs, or a run where the reference edge was not equal to r(0). Regardless of the method invoked, decoding the run selected is performed in the reverse of the encoding procedure discussed above with respect to encoding of the run.

After the decoding has occurred in task 718 of the alternate embodiment, as was the case in the preferred embodiment, the method determines whether or not the end of the line being decoded has been reached in task 720. In this embodiment, if the end of the line has not been reached, and if an end of reference code is not encountered, then the method returns to task 718 and decoding of a task, run-of-runs or a run where the reference edge does not equal r(0) is performed. If an end of reference code is encountered, then the method returns to task 712 and decodes the next pair of runs using the back-up decoding discussed above.

OTHER EMBODIMENTS

While there have been shown what are presently considered to be preferred embodiments of the present invention, it will be apparent to those skilled in the art that various changes and modifications can be made herein without departing from the scope of the invention as defined by the appended claims.

PERFORMANCE RESULTS

The increase in compression ratio as a result of using method 600 is shown in Table I. The results are indicative of a test of the method 600 used on periodic test images. As shown below, the method 600 yielded an almost, four-fold increase in compression over the current MMR algorithm. Both methods were applied for compressing the test images.

TABLE I

Compressed Size (Ratio) on Periodic Halftoned Test Images

| Image Title | MMR Bytes | (Ratio) | Present Invention (PI) Bytes | (Ratio) |
| --- | --- | --- | --- | --- |
| f1-5-10 | 2,598,746 | (1.42) | 469,748 | (7.84) |
| f2-5-10 | 1,878,203 | (1.30) | 405,129 | (6.01) |
| f3-5-10 | 1,165,624 | (2.31) | 61,907 | (16.63) |
| f4-5-10 | 2,074,551 | (1.22) | 527,703 | (4.80) |
| f1-32-32 | 1,904,485 | (1.93) | 574,171 | (6.41) |
| f2-32-32 | 1,413,471 | (1.72) | 473,475 | (5.15) |
| f3-32-32 | 460,372 | (5.85) | 147,248 | (18.18) |
| f4-32-32 | 1,637,140 | (1.55) | 543,977 | (4.65) |
| Average: | 1,641,574 | | 413,026 | |

MMR Method: Does not adjust to periodicity
PI Method: Uses one periodicity value per page As shown in Table I, a test was run on one image using a 5×10 grid. After running the MMR compression program in test f1, the data was compressed by a ratio 1.42, reflecting 2,598,746 bytes of information. Using the present invention on the same test grid resulted in a total of 469,784 bytes of data and a compression ratio of 7.84. As is apparent from the table, the test f1 resulted in far superior compression ratios when using the present invention. Similarly, similar results were experienced in tests f2, f3 and f4 involving three other images encompassed in a 5×10 grid. Further review of the table involving images f1 through f4, showing results based on using a 32×32 grid, reflect similar results. On average, the present invention experienced a four-fold increase in compression ratio over the MMR method. As expected, the MMR method could not adjust to the changing periodicity experienced in the digital image whereas the present invention used one periodicity value per page encoded.

Increased speed in compressing and decompressing the periodic halftoned bitonal image is shown in Table II. As indicated, the speed of executing the method 600 was substantially faster than the speed of executing the MMR method for each test. Both methods, the MMR method and the method 600, were tested on the same periodic test image used in tests f1–f4 for the compression testing as indicated above.

TABLE II

Compression Times on Periodic Halftoned Test Images

| Image Title | MMR Com. | Dec. | PI Com. | Dec. |
| --- | --- | --- | --- | --- |
| f1-5-10 | 1.04 | 1.23 | 0.76 | 0.60 |
| f2-5-10 | 0.82 | 0.95 | 0.60 | 0.52 |
| f3-5-10 | 0.48 | 0.56 | 0.36 | 0.28 |
| f4-5-10 | 0.93 | 1.09 | 0.72 | 0.56 |
| f1-32-32 | 0.90 | 1.03 | 0.76 | 0.60 |
| f2-32-32 | 0.68 | 0.81 | 0.56 | 0.48 |
| f3-32-32 | 0.32 | 0.32 | 0.28 | 0.20 |
| f4-32-32 | 0.82 | 0.96 | 0.68 | 0.56 |
| Total: | 5.99 | 6.95 | 4.72 | 3.80 |

Com: Compression time in seconds
Dec: Decompression time in seconds

As indicated in Table II, the MMR compression time for f1 was 1.04 seconds and the compression time for the method of the present invention was 0.76 seconds. The decompression method used in the MMR method resulted in a time of 1.23 seconds as compared to a decompression time of 0.60 seconds for the present invention. Similar results can be seen in the remaining tests, and also apply to tests f1 through f4 for the respective images in a 32×32 grid. The results show that the method of the present invention is almost twice as fast in compressing and decompressing periodic halftoned images than the MMR method.

We claim:

1. A method for compressing bilevel images by encoding vertical edges with respect to non-contiguous other vertical edges, wherein the edges are contained within causal image data, the method comprising:

dividing a spacially periodic digital bilevel image into a grid of pixels containing digital information indicative of image color, the image including vertical edges comprising adjacent pixel color changes; and encoding the vertical edges with respect to a non-contiguous other vertical edges located at a specified distance within the causal image data, the encoding using the specified distance, causal data, and non-contiguous edge correlations to compress the grid of pixels, and employing a back-up encoding scheme to encode the vertical edges if the non-contiguous vertical edge correlation is insufficient.

2. The method of claim 1, wherein the vertical edges comprise horizontally adjacent pixel color changes.

3. The method of claim 2, wherein each pixel and each pixel grid is rectangular.

4. The method recited in claim 3 including decoding the lines to reconstruct an image.

5. The method of claim 4, wherein the specified distance equals $(\tau_x \pm n, \tau_y)$.

6. A method for compressing spacially periodic digital images by encoding target vertical edges located $\tau \pm n$ pixels from reference vertical eddies in an image, the method comprising:

dividing an image contained in horizontal raster sequence image data into horizontal runs of pixels containing digital information indicative of bilevel image color;

encoding the runs by:

selecting a value for $\tau$, where $\tau$ comprises a periodic distance between run edges and where the run edges are not spacially contiguous; and encoding a target edge of a run located τ±n pixels from a designated run edge of a reference run.

7. The method recited in claim 6, wherein τ is less than the length of a horizontal line, τ is contained in the line and n≠o.

8. The method recited in claim 6, wherein τ≦the length of a horizontal line, τ is contained in the line, and n=o.

9. The method recited in claim 6, wherein τ>the length of a horizontal line.

10. The method recited in claim 6, including decoding the lines to reconstruct an image.

11. The method recited in claim 6, wherein encoding target run edges τ±n pixels from a designated run edge of a reference run further comprises:
   grouping successive target run edges together, grouped run edges all being located τ±n pixels from their respective designated reference run edge;
   encoding the group of successive run edges; and
   switching to back-up coding for a next target run edge following the group.

12. The method recited in claim 11, including skipping past a reference run edge to reach a reference run edge synchronized with a target run edge to be encoded, the target run edge comprising an edge of an image color change.

13. The method recited in claim 12, including adding a white flag bit to the end of each backup encoded run pair, wherein the white flag bit signals that reference coding should be used for encoding a next target run edge.

14. The method recited in claim 13, including encoding an end-of-image signal at a beginning of a non all-white line, and when the signal is encountered, encoding a white run using backup coding.

15. The method recited in claim 14, including decoding the lines to reconstruct the image.

16. The method recited in claim 14, including decoding the lines to reconstruct the image.

17. The method recited in claim 6, wherein τ>the length of a horizontal line and n=o.

18. A method for compressing spacially periodic digital bilevel images by encoding target vertical edges in an image with respect to a reference vertical edge located at a specified distance, the method comprising:
   dividing an image contained in raster sequential data into horizontal runs of data containing digital information indicative of a bilevel image color;
   encoding the runs by:
      selecting a value for τ, where τ comprises a periodic distance between run edges and where the run edges are not spacially continuous; and
      encoding a target run edge of a run located τ±n pixels from a designated references edge, where τ≦the length of a horizontal line and τ is contained within the line.

19. The method recited in claim 18, wherein encoding target run edges τ±n pixels from a designated run edge further comprises:
   grouping successive target run edges together, grouped run edges all being located τ±n pixels from their respective designated run edge;
   encoding the group of successive run edges; and
   switching to back-up coding for a next target run edge following the group.

20. The method recited in claim 19, including skipping past a reference run edge to reach a reference run edge synchronized with a target run edge to be encoded.

21. The method recited in claim 20, including adding a white flag bit to the end of each backup encoded run edge pair, wherein the white flag bit signals that reference coding should be used for encoding a next target run edge.

22. The method recited in claim 21, including encoding an end-of-image signal at a beginning of a non all-white line, and when the signal is encountered, encoding a white run edge using backup coding.

23. A signal-bearing medium tangibly embodying a program of machine-readable instructions executable by a digital processing apparatus to perform a method for compressing bilevel images by encoding vertical edges with respect to non-contiguous other vertical edges, wherein the edges are contained within causal image data, the method comprising:
   dividing a spacially periodic digital bilevel image into a grid of pixels containing digital information indicative of image color, the image including vertical edges comprising adjacent pixel color changes; and
   encoding the vertical edges with respect to non-contiguous non-contiguous vertical edges located at a specified distance within the causal image data, the encoding using the specified distance, causal data, and non-contiguous edge correlations to compress the grid of pixels; and
   employing a back-up encoding scheme to encode the vertical edges if the non-contiguous vertical edge correlation is insufficient.

24. The signal bearing medium recited in claim 23, wherein the vertical edges comprise horizontally adjacent pixel color changes.

25. The signal bearing medium recited in claim 24, wherein each pixel and each pixel grid is rectangular.

26. The signal bearing medium recited in claim 25, wherein the specified distance equals $(\tau_x \pm n, \tau_y)$.

27. The signal bearing medium recited in claim 24, the embodied method including decoding the lines to reconstruct an image.

28. A signal-bearing medium tangibly embodying a program of machine-readable instructions executable by a digital processing apparatus to perform a method for compressing spacially periodic digital bilevel images by encoding vertical edges in an image with respect to non-contiguous other vertical edges located at a specified distance the method comprising:
   dividing an image contained in raster sequential data into horizontal runs of pixels containing digital information indicative of bilevel image color; encoding the runs by:
      selecting a value for τ, where τ comprises a periodic distance between run edges and where the run edges are not spacially contiguous; and
      encoding a target edge of a run located τ±n pixels from a designated run edge of a reference run, where τ≦the length of a horizontal line and contained within the line.

29. The signal bearing medium recited in claim 28, wherein τ is less than the length of a horizontal line, τ is contained in the line, and n≠o.

30. The signal bearing medium recited in claim 28, wherein τ≦the length of a horizontal line, τ is contained in the line, and n≠o.

31. The signal bearing medium recited in claim 28, wherein τ>the length of a horizontal line.

32. The signal bearing medium recited in claim 28, including decoding the lines to reconstruct an image.

33. The signal bearing medium recited in claim 28, wherein encoding target run edges τ±n pixels from a designated run edge of a reference run further comprises:
   grouping successive target run edges together, grouped run edges all being located τ±n pixels from their respective designated reference run edge;

encoding the group of successive run edges; and switching to back-up coding for a next target run edge following the group.

34. The signal bearing medium recited in claim 33, including skipping past a reference run edge to reach a reference run edge synchronized with a target run edge to be encoded, the target run edge comprising an edge of an image color change.

35. The signal bearing medium recited in claim 34, including adding a white flag bit to the end of each backup encoded run pair, wherein the white flag bit signals that reference coding should be used for encoding a next target run edge.

36. The signal bearing medium recited in claim 35, including encoding an end-of-image signal at a beginning of a non all-white line, and when the signal is encountered, encoding a white run using backup coding.

37. The signal bearing medium recited in claim 36, including decoding the lines to reconstruct the image.

38. A signal-bearing medium tangibly embodying a program of machine-readable instructions executable by a digital processing apparatus to perform a method for compressing spacially periodic digital bilevel images by vertically encoding target edges in an image with respect to a reference edge located at a specified distance, the method comprising:

dividing an image contained in raster sequential data into horizontal run lines of data containing digital information indicative of a bilevel image color;

encoding the runs by:
selecting a value for $\tau$, where $\tau$ comprises a periodic distance between run edges and where the run edges are not spacially contiguous; and encoding a target run edge of a run located $\tau \pm n$ pixels from a designated reference edge, where $\tau \leq$ the length of a horizontal line and $\tau$ is contained within the line.

39. The signal bearing medium recited in claim 38, wherein encoding target run edges $\tau \pm n$ pixels from a designated run edge further comprises:

grouping successive target run edges together, grouped run edges all being located $\tau \pm n$ pixels from their respective designated run edge;

encoding the group of successive run edges; and switching to back-up coding for a next target run edge following the group.

40. The signal bearing medium recited in claim 39, including skipping past a reference run edge to reach a reference run edge synchronized with a target run edge to be encoded.

41. The signal bearing medium recited in claim 40, including adding a white flag bit to the end of each backup encoded run edge pair, wherein the white flag bit signals that reference coding should be used for encoding a next target run edge.

42. The signal bearing medium recited in claim 41, including encoding an end-of-image signal at a beginning of a non all-white line, and when the signal is encountered, encoding a white run edge using backup coding.

43. The signal bearing medium recited in claim 42, including decoding the lines to reconstruct the image.

44. An apparatus for compressing spacially periodic digital images by encoding run edges in an image with respect to non-contiguous other run edges located at a specified distance, the apparatus comprising:

a processor to divide an image comprising vertical edges;

an encoder capable of encoding the image for compressing the image by:

dividing a spacially periodic digital bilevel image into a grid of pixels containing digital information indicative of image color, the image including vertical edges comprising adjacent pixel color changes;

encoding the vertical edges with respect to non-contiguous other vertical edges located at a specified distance within the causal image data, the encoding using, the specified distance, causal data, and non-contiguous edge correlations to compress the grid of pixels; and employing a back-up encoding scheme to encode the vertical edges if the non-contiguous vertical edge correlation is insufficient.

45. The apparatus recited in claim 44, including a decoder to decompress the image.

46. The apparatus recited in claim 45, wherein the vertical edges comprise horizontally adjacent pixel color changes, each pixel and each pixel grid is rectangular, and the specified distance equals $(\tau_x \pm n, \tau_y)$.

47. An apparatus for compressing spacially periodic digital images by encoding target vertical edges located $\tau \pm n$ pixels from reference vertical edges in an image, the apparatus comprising:

a processor to divide an image comprising vertical edges;

an encoder to encode the image by:

dividing the image contained in horizontal raster sequence image data into horizontal runs of pixels containing digital information indicative of bilevel image color;

encoding the runs by:
selecting a value for $\tau$, where $\tau$ comprises a periodic distance between run edges and where the run edges are not spacially contiguous; and encoding a target edge of a run located $\tau \pm n$ pixels from a designated run edge of a reference run.

48. The apparatus recited in claim 47, including a decoder for decoding the lines to reconstruct an image.

49. The apparatus recited in claim 47, the encoder encoding target run edges $\tau \pm n$ pixels from a designated run edge of a reference run further comprises:

grouping successive target run edges together, grouped run edges all being located $\tau \pm n$ pixels from their respective designated reference run edge;

encoding the group of successive run edges; and switching to back-up coding for a next target run edge following the group.

50. The apparatus recited in claim 49, the encoder skipping past a reference run edge to reach a reference run edge synchronized with a target run edge to be encoded the target run edge comprising an edge of an image color change.

51. The apparatus recited in claim 50, the encoder adding a white flag bit to the end of each backup encoded run pair wherein the white flag bit signals that reference coding should be used for encoding a next target run edge.

52. The apparatus recited in claim 51, the encoder encoding an end-of-image signal at a beginning of a non all-white line, and when the signal is encountered, encoding a white run using backup coding.

* * * * *